(12) United States Patent
Monconduit-Jegou et al.

(10) Patent No.: US 6,939,643 B2
(45) Date of Patent: Sep. 6, 2005

(54) LITHIUM-MATERIAL COMPRISING AN INTERMETALLIC LITHIUM/TRANSITION METAL PNICTIDE PHASE FOR LITHIUM BATTERIES

(75) Inventors: Laure Monconduit-Jegou, Jacou (FR); Frédéric Gillot, La Calmette (FR); Marie-Liesse Doublet, Draveil (FR)

(73) Assignees: Centre National de la Recherche Scientifique (CNRS), Paris (FR); Universite de Montpellier II, Montpellier (FR)

( * ) Notice: Subject to any disclaimer, the term of this patent is extended or adjusted under 35 U.S.C. 154(b) by 0 days.

(21) Appl. No.: 10/015,603

(22) Filed: Dec. 17, 2001

(65) Prior Publication Data

US 2003/0113631 A1 Jun. 19, 2003

(51) Int. Cl.$^7$ .............................. H01M 4/58; H01M 4/88
(52) U.S. Cl. ............................ 429/231.95; 429/231.5; 429/218.1; 252/182.1; 423/299

(58) Field of Search ..................... 429/231.95, 231.9, 429/231.5; 252/182.1; 423/351, 299

(56) References Cited

U.S. PATENT DOCUMENTS

| | | | | |
|---|---|---|---|---|
| 5,247,349 A | * | 9/1993 | Olego et al. ................. 257/629 |
| 2002/0015890 A1 | * | 2/2002 | Nakura ................... 429/231.95 |
| 2003/0003369 A1 | * | 1/2003 | Dai ............................. 429/324 |
| 2003/0113626 A1 | * | 6/2003 | Maeda et al. ............... 429/217 |

* cited by examiner

Primary Examiner—Raymond Alejandro
(74) Attorney, Agent, or Firm—Burns, Doane, Swecker & Mathis, LLP

(57) ABSTRACT

The invention provides a rechargeable lithium-ion battery comprising the specific lithium composite exhibiting good charge-discharge cycle performance and mechanical properties. The lithium-material comprises an intermetallic lithium/transition metal pnictide phase, wherein the transition metal present in said lithium/transition metal pnictide phase is a metal of one of the columns IVa and Va of the periodic table of the elements.

10 Claims, 3 Drawing Sheets

Figure 1:
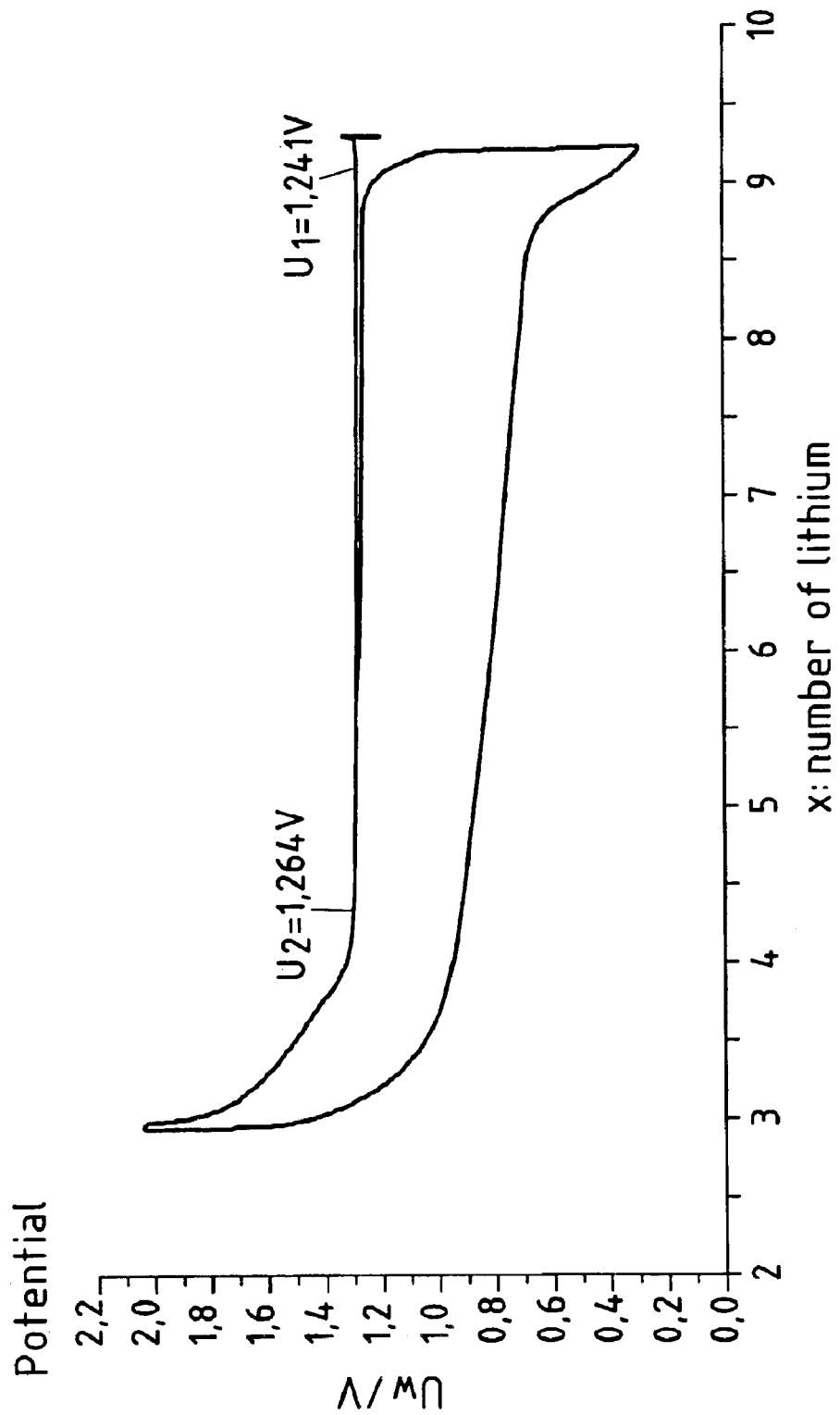

LITHIUM-MATERIAL COMPRISING AN INTERMETALLIC LITHIUM/TRANSITION METAL PNICTIDE PHASE FOR LITHIUM BATTERIES

BACKGROUND OF THE INVENTION

Rechargeable lithium battery technology has become increasingly important in recent years because it is providing new, lightweight, high energy density batteries for powering applications in the rapidly growing electronics industry. These batteries are also of interest because of their possible application in electric vehicles and hybrid electric vehicles.

State-of-the-art rechargeable lithium batteries are known as "lithium-ion" batteries because during charge and discharge, lithium ions are shuttled between two host electrode structures with a concomitant reduction and oxidation of the host electrodes. Lithium batteries are prepared from one or more lithium electrochemical cells comprising positive and negative electrodes and an electrolyte. Such electrodes are usually tested, before insertion in lithium-ion battery, in lithium metal batteries which include as an anode (negative electrode), a metallic lithium-based material (used as a reference with a potential of 0V), as a cathode (positive electrode), for example a transition metal oxide, and an electrolyte interposed between electrically insulated, spaced-apart, positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and transition metal oxide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The best known lithium-ion cell is a 3.5 V $Li_xC_6/Li_{1-x}CoO_2$ cell, in which lithium is extracted from a layered $LiCoO_2$ structure (positive electrode or cathode) during charge and inserted into a carbonaceous structure (negative electrode or anode), typically graphite or a "hard" or pyrolyzed carbon, presenting a specific capacity around 372 mAh/g. Lithiated carbons can approach and reach the potential of metallic lithium at the top of the charge cycle. Therefore, these negative electrodes or anodes are highly reactive materials, particularly in the presence of a highly oxidizing $Li_{1-x}CoO_2$ positive electrode and a flammable organic electrolyte. There is, therefore, a concern about the safety of charged lithium-ion cells; sophisticated electronic circuitry has to be incorporated into each cell to protect them from overcharge and abuse. This invention addresses the need to find alternative negative electrode materials to carbon.

Negative electrodes different from carbon ones have been already described, such as tin oxide, tin or antimony alloys. But, these electrodes present a relatively poor capacity and a high variation of expansion/contraction volume during insertion/desinsertion of lithium (around 400% by volume) which induces a rapid decay in mechanical properties. Their low potential may also raise safety issues, as the carbon.

SUMMARY OF THE INVENTION

This invention relates to a lithium composite which can be used as an electrode material with improved electronic conductivity. The material is of particular interest as negative electrodes for lithium cells and batteries, and in particular rechargeable lithium-ion cells or batteries. The invention therefore includes new electrodes, methods of making the electrodes, the use of the materials as electrodes in lithium cells and batteries, and cells and batteries employing such electrodes.

The invention provides a rechargeable lithium-ion battery comprising the specific lithium composite exhibiting good charge-discharge cycle performance and mechanical properties.

A more complete appreciation of the invention and many of the advantages thereof will be readily obtained as the same become better understood by reference of the following detailed description.

In general, the electrochemical properties of the electrodes have been evaluated in cells against a lithium counter [reference] electrode.

Figure 2:
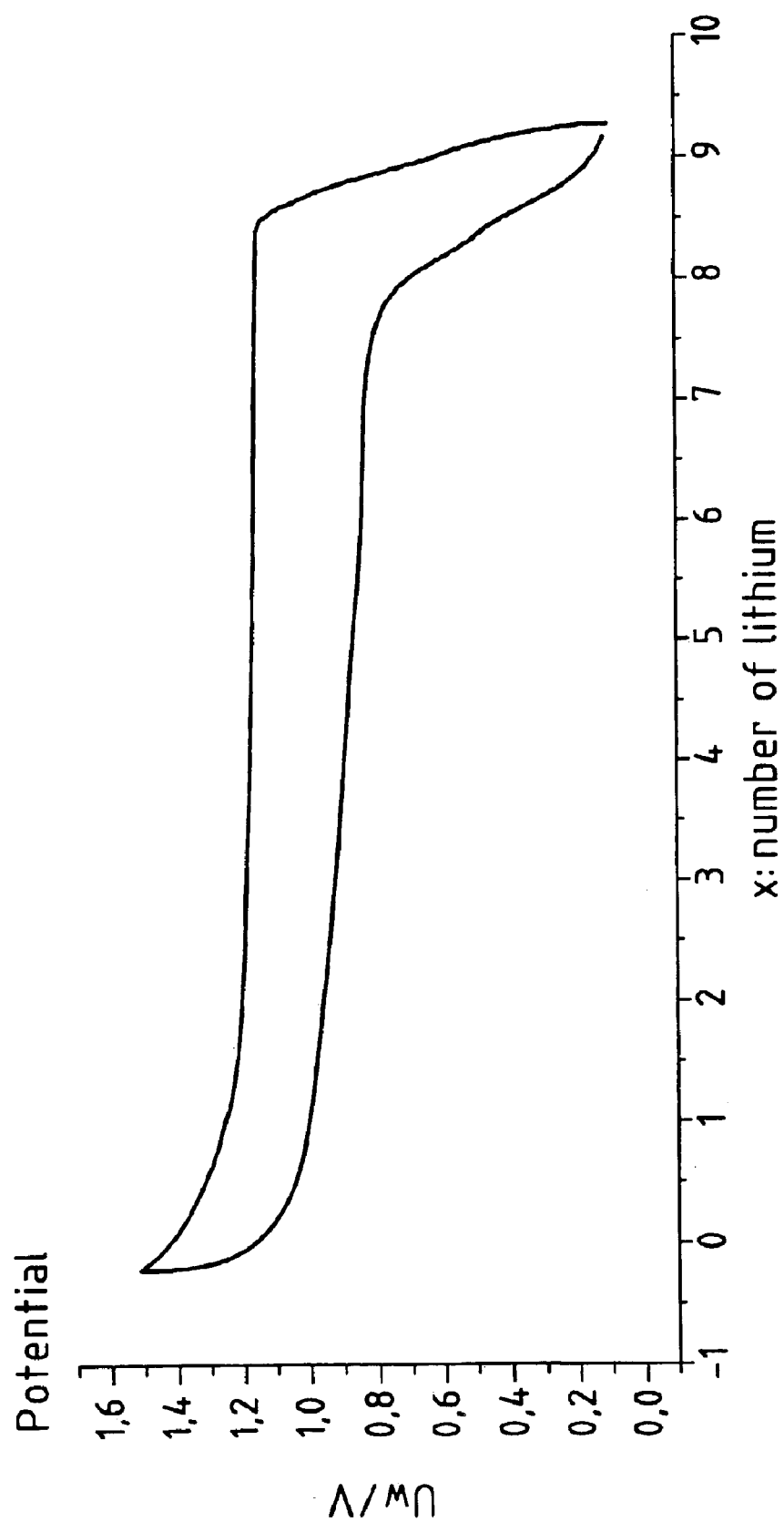
Figure 3:
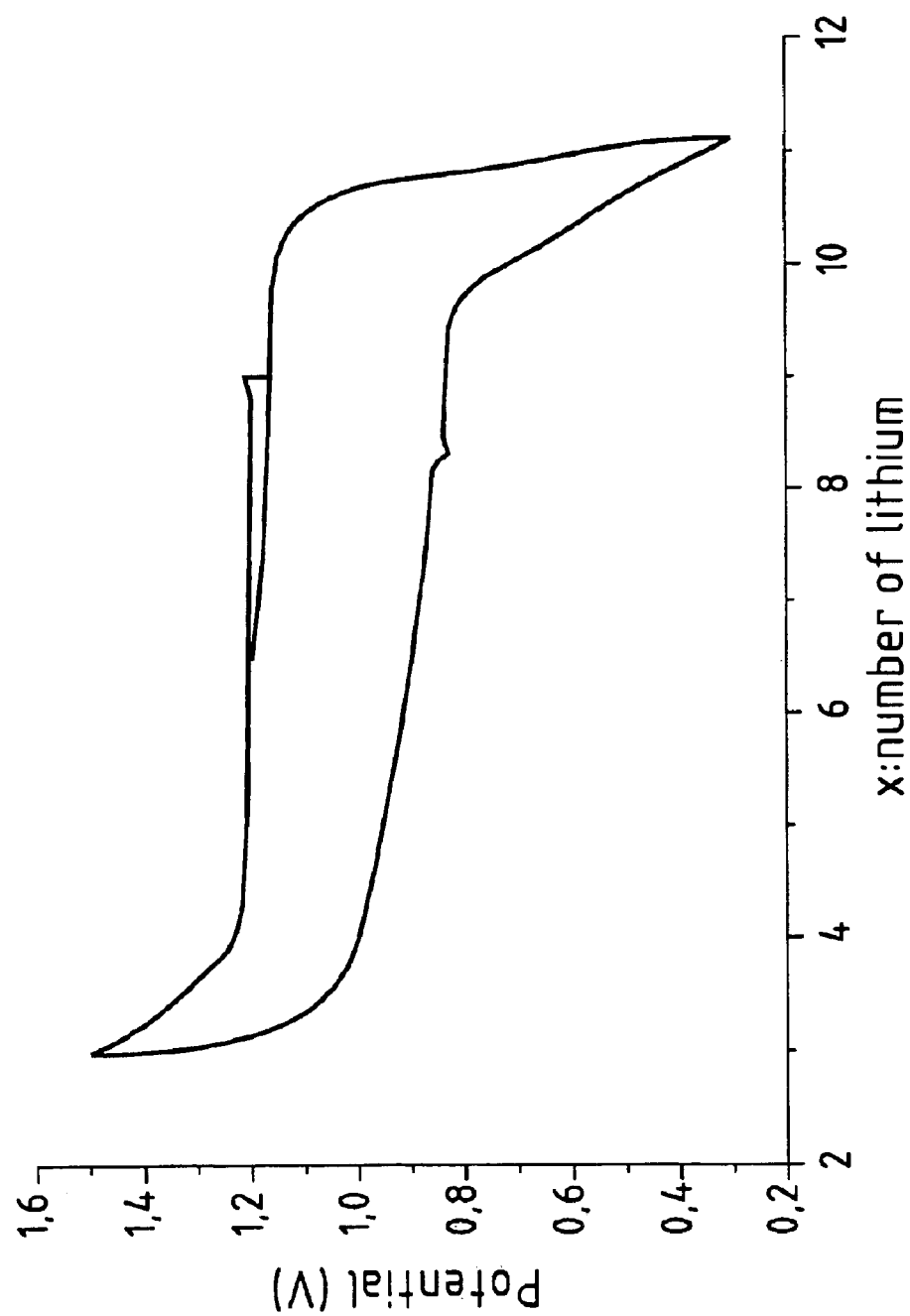

FIGS. 1, 2 and 3 are graphical representations of the potentials (Uw/V) of $Li_{9.3}Ti_{1.1}P_4$, $Li_{5.5}VP_4$ and $Li_9VAs_4$ respectively tested as positive electrodes versus the number of inserted lithium atoms (x) over the first cycles.

DESCRIPTION OF THE INVENTION

The present invention relates to a new electrode comprising an intermetallic lithium/transition metal pnictide phase, wherein the transition metal present in said lithium/transition metal pnictide phase is a metal of one of the columns IVa and Va of the periodic table of the elements (corresponding to previous IUPAC form, equivalent to columns IVb and Vb of the CAS version). The said electrode is able to implement an electrochemical insertion and/or deinsertion of lithium.

The electrode according to the invention presents more preferably intermetallic compounds or phases containing $MPn_4$ anions, wherein M represents a metal of one of the columns IVa and Va of the periodic table of the elements and Pn represents a pnictogen atom, in association with Li cations. These compounds are intermediate between ionic compounds and metallic phases.

More specifically, the intermetallic lithium/transition metal pnictide phase of the implemented material is depicted by formula (I):

$$Li_xM_yPn_4 \qquad (I)$$

wherein:
M represents a metal of one of the columns IVa and Va of the periodic table of the elements;
Pn represents a pnictogen element selected in the group consisting of N, P, As, and Sb;
x represents a number between 2.0 and 11.0; and
y represents a number between 0.2 and 2.2.

In this formula, x varies upon charge and discharge of the said electrode and y depends on the chemical nature of M. For instance, starting from the nominal composition $Li_9VAs_4$, a whole electrochemical cycle can be realized (0<U<1.5V) from $Li_3VAs_4$ (end of the charge) to $Li_{11}VAs_4$ (end of the discharge).

Indeed, surprisingly, the intermetallic phases present during charge and discharge of lithium a very particular and interesting behavior: the stoichiometry of $MyPn_4$ part does not vary upon charge and discharge and, during an electrochemical cycle, the addition of lithium does not change substantially the structure of the network of the transition metal pnictide phase, there is more specifically a volume variation of less than 1%. This result gives the opportunity to provide lithium rechargeable batteries comprising such electrodes with unproved mechanical properties.

Particularly, y represents in formula (I) a number between 0.4 and 2.1 and more preferably between 0.7 and 1.3.

Preferably, in formula (I), M represents a metal of the group consisting of Ti, V, Nb and Ta.

The specific capacity of the electrode according to the invention ranges more particularly from 200 to 1000 mAh/g vis-à-vis lithium, after at least one charge/discharge cycle. The specific capacity ranges preferably from 500 to 1000 mAh/g and most preferably is at least 600 mAh/g. Moreover, the electrode according to the invention does not lose considerable capacity upon cycling, contrary to known lithium alloys.

More particularly, the intermetallic lithium/transition metal pnictide phase, as the starting material, before charge and discharge, is represented by one of the following formulae: $Li_7VP_4$, $Li_{5.5}VP_4$, $Li_{6.6}Ti_{1.3}P_4$, $Li_{9.3}Ti_{1.1}P_4$, $Li_9TiP_4$, $Li_2VAs_4$, $Li_2V_2As_4$, $Li_7VAs_4$, $Li_{5.5}V_{1.2}As_4$, and $Li_9VAs_4$.

The invention further provides a process for making an electrode as described above, wherein the intermetallic lithium/transition metal pnictide phase is obtained by a method comprising a step consisting of treating at a temperature ranging from 400° C. to 1000° C., more preferably from 800° C. to 1000° C., a blend comprising:

(i) a pnictogene element, in the elemental form and/or in the form of pnictide anions;
(ii) lithium, in the metallic form and/or in the form of lithium cations; and
(iii) said transition metal of one of the columns IVa and Va of the periodic table of the elements, in a metallic form.

To prevent any side-reaction, such as oxidation, the above described process is preferably carried out under inert atmosphere, such as argon.

The molar ratio (lithium (ii)/pnictogene element (i)) is comprised between 2/4 and 11/4 in said blend; and the molar ratio (transition metal (iii)/pnictogene element (i)) between 0.2/4 and 2.2/4 in said blend.

The blend preferably implemented comprises:
a lithium pnictide; and
said transition metal in a metallic form.
It may also further comprises lithium in a metallic form.
In another preferred embodiment, the blend comprises:
phosphorus or arsenic, in the elemental state;
metallic lithium; and
said transition metal, in a metallic form.

After the said thermal treatment, the blend is preferably submitted to a quenching step. The quenching step may be carried out by cooling the blend at a temperature of less than 10° C. and preferably more than −210° C. This can be achieved for instance in icy water, at temperature ranging from −10° C. and 10° C., or most preferably in liquid nitrogen.

The above described electrode can be inserted as a negative electrode in an electrochemical cell or in a rechargeable lithium-ion battery which comprises a plurality of cells, electrically connected, each cell comprising also an electrolyte and a positive electrode.

Thus, the present invention also provides an electrochemical cell and a rechargeable lithium-ion battery which comprises a plurality of cells, electrically connected, each cell comprising a negative electrode, an electrolyte and a positive electrode, the negative electrode corresponding to a material as described above containing an intermetallic lithium/transition metal pnictide phase, said transition metal being a metal of one of the columns IVa and Va of the periodic table of the elements.

An electrochemical cell usually has an anode separated by an electrolyte and a cathode, all contained in an insulating housing with the anode separated from the cathode by the electrolyte and eventually suitable terminals being provided in electrical contact respectively with the anode and the cathode. A battery usually comprises several (two or more) strings of cells in parallel and each string comprises at least two cells in series. Binders and other materials normally associated with both the electrolyte and the anode and the cathode are well known and are not described herein, but are included as is understood by those of ordinary skill in the art.

EXAMPLES

Synthesis:

$Li_xMPn_4$ phases were prepared from the elements inside niobium or tantalum tubes sealed under argon by arc welding. The binary $Li_3Pn$ (Pn=N, P, As, Sb) phases was also used as starting compound. Reagents were mixed inside a niobium tube sealed under argon by arc welding.

Except for lithium, powders of the elements were used. Lithium metal, titanium, vanadium, niobium, tantalum, and red phosphorus were used without purification. Arsenic was purified at 320° C. under vacuum to eliminate the arsenic oxide ($As_2O_3$) impurities. $Li_xMPn_4$ alloys were prepared in stoichiometric proportions by melts of i) lithium and pnictogens that attack the transition metal, ii) $Li_3Pn$, Pn and M or iii) $Li_3Pn$ and MPn. They were heated at T° C. (T1, T2 . . . ) in several steps (ΔT1, ΔT2 . . . ) and quenched (water or liquid nitrogen) thereafter to prevent the formation of relatively stable binary phases. Starting materials and products which are air and moisture sensitive were handled in an argon-filled glove box.

$Li_7VP_4$:

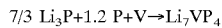
7/3 $Li_3P$+1.2 P+V→$Li_7VP_4$

ΔT1=50° C./hour→T1=1000° C. (2 h)→ΔT2=50° C./h→T2=900° C. (48 h).

quenching step in water.

$Li_{5.5}VP_4$:

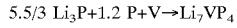
5.5/3 $Li_3P$+1.2 P+V→$Li_7VP_4$

ΔT1=50° C./hour→T1=1000° C. (2 h)→ΔT2=50° C./h→T2=900° C. (48 h).

quenching step in water.

$Li_{6.6}Ti_{1.3}P_4$:

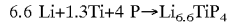
6.6 Li+1.3Ti+4 P→$Li_{6.6}TiP_4$

ΔT1=50° C./h→T1=500° C. (2 days)→ΔT2=50°/h→T2=1000° C. (2 h)→ΔT3=50°/h→T2=900° C. (3 days)

quenching step in water.

$Li_{9.3}Ti_{1.1}P_4$:

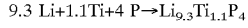
9.3 Li+1.1Ti+4 P→$Li_{9.3}Ti_{1.1}P_4$      1)

ΔT1=50°/h→T1=500° C. (2 days)→ΔT2=50°/h→T2=1000° C. (2 H)→ΔT3=50°/h→T3=900° C. (3 days)

quenching step in water.

$$9.3/3 \, Li_3P + 0.9 \, P + 1.1 \, Ti \rightarrow Li_{9.3}Ti_{1.1}P_4 \quad (2)$$

$\Delta T1 = 50°/h \rightarrow T1 = 600°$ C. (8 days)

quenching step in water.
$Li_9TiP_4$:

$$9/3 \, Li_3P + Ti + 4/3 \, P \rightarrow Li_9TiP_4$$

$\Delta T1 = 50°$ C./h $\rightarrow T1 = 1000°$ C. (2 h) $\rightarrow \Delta T2 = 50°/h \rightarrow T2 = 900°$ C. (48 H)

quenching step in nitrogen liquid.
$Li_2VAs_4$:

$$2 \, Li + V + 4 \, As \rightarrow Li_2VAs_4$$

$\Delta T1 = 50°/h \rightarrow T1 = 1000°$ C. (2 h) $\Delta T2 = 50°/h \rightarrow T2 = 900°$ C. (2 days)

quenching step in water.
$Li_2V_2As_4$:

$$2 \, Li + 2V + 4 \, As \rightarrow Li_2V_2As_4$$

$\Delta T1 = 50°/h \rightarrow T1 = 900°$ C. (4 days) $\rightarrow \Delta T2 = 200°/h \rightarrow T2 = 30°$ C.

$Li_7VAs_4$:

$$7 \, Li + V + 4 \, As \rightarrow Li_7VAs_4$$

$\Delta T1 = 50°/h \rightarrow T1 = 1000°$ C. (2 h) $\rightarrow \Delta T2 = 50°/h \rightarrow T2 = 900°$ C. (48 h)

quenching step in water.
$Li_{5.5}V_{1.2}As_4$:

$$5.5 \, Li + 1.2V + 4 \, As \rightarrow Li_{5.5}VAs_4$$

$\Delta T1 = 50°/h \rightarrow T1 = 1000°$ C. (2 h) $\rightarrow \Delta T2 = 50°/h \rightarrow T2 = 900°$ C. (48 h)

quenching step in water.
$Li_9VAs_4$:

$$9 \, Li + V + 4 \, As \rightarrow Li_9VAs_4$$

$\Delta T1 = 50°/h \rightarrow T1 = 1000°$ C. (2 h) $\rightarrow \Delta T2 = 50°/h \rightarrow T2 = 900°$ C. (48 h)

quenching step in water.
Performance:

$Li_{9.3}Ti_{1.1}P_4$, $Li_{5.5}VP_4$ and $Li_9VAs_4$ were tested as positive electrodes vis-à-vis a metallic lithium as a negative electrode in swagelock-type cells. Good capacities are obtained: 700 mAh/g (volumic capacity: 1316 mAh/cm³), 650 mAh/g (volumic capacity: 1750 mAh/cm³) and 530 mAh/g (volumic capacity: 1560 mAh/cm³), respectively. It is to be noted that these electrodes present a low potential (around 1V) which make them particularly useful as negative electrodes in lithium-ion batteries.

FIGS. 1, 2 and 3 are graphical representations of the potentials (Uw/V) of $Li_{9.3}Ti_{1.1}P_4$, $Li_{5.5}VP_4$ and $Li_9VAs_4$ tested as positive electrodes versus the number of inserted lithium atoms (x) over the first cycles. The experimental conditions were as follows: I=0.08 mA (10 mA/g) (oxidation) for $Li_{9.3}Ti_{1.1}P_4$, and I=−0.08 mA (10 mA/g) (reduction) for $Li_{5.5}VP_4$ and $Li_9VAs_4$, 0<U<3V, galvanostatic mode (Mac Pile system), $Li_{9.3}Ti_{1.1}P_4$, $Li_{5.5}VP_4$ or $Li_9VAs_4$ (85% by weight), PTFE binder (10% by weight), C black (5% by weight), 1M $LiClO_4$ in PC-EC (1:1, v/v) as electrolyte, counter electrode pure lithium.

Crystallographic Data:

The Li/M/X phases can be considered as transition metal-substituted $Li_3X$ phases. The insertion of a small quantity of transition metal atoms in $Li_3As$, providing a light structural deformation, transforms the hexagonal cell on to a cfc one. This cubic cell is intermediate between the antifluorite (A) and the Zinc-Blend (B) types. The structure is described either in Fm3m (A) or in F43m (B) space group and the cationic occupation is defined as follows: in the A structure, the other octahedral site 4b (½, ½, ½) is left vacant and the tetrahedral site 8c (¼, ¼, ¼) is statistically occupied by Li and M. In the B structure both metals, Li and M, randomly occupy the 4c site (¼, ¼, ¼) and the 4d site is left vacant. However, site 4b (½, ½, ½) is found to be partially filled by supplementary lithium.

All the characterized phases, prepared directly at high temperature, display a variable occupation of the tetrahedral $n^{Td}$ and octahedral $n^{Oh}$ sites. The cationic filling leads to a stoichiometric range in $Li_xVAs_4$ ($a(Li_{4.5}V_{1.2}As_4)=6.167$ Å, $a(Li_7VAs_4)=6.162$ Å, $a(Li_9VAs_4)=6.175$ (Å) with no cell parameter modification. The introduction of transition metal with an oxidation state higher than +1 leads to cationic vacancies. Thus these deficient phases prone to accept additional lithium without structural modification (topotactic process). The cfc lattice of the pnictogen can accept up to 12 metal cations (Li/M) to fill the tetrahedral ($n^{Td}=8$) and octahedral ($n^{Oh}=4$) sites. Starting from the A or B structures the insertion of additional lithium occurs either at the 4b or 4c/4d sites. The occupation strongly modifies the environment of As and M atoms. Lithium insertion can be carried chemically or electrochemically.

What is claimed is:

1. An electrode comprising an intermetallic lithium/transition metal pnictide phase, wherein the lithium/transition metal pnictide phase is depicted by formula (I):

$$Li_xM_yPn_4 \quad (I),$$

wherein:
M represents a metal of one of the columns IVa and Va of the periodic table of the elements;
Pn represents a pnictogene element selected in the group consisting of P, As, and Sb;
x represents a number between 2.0 and 11.0; and
y represents a number between 0.2 and 2.2.

2. An electrode according to claim 1, wherein, in formula (I), M represents a metal of the group consisting of Ti, V, Nb and Ta.

3. An electrode according to claim 1, wherein, in formula (I), y represents a number between 0.4 and 2.1.

4. An electrode according to claim 1, wherein, in formula (I), y represents a number between 0.7 and 1.3.

5. An electrode according to claim 1, wherein the pnictogene element is P.

6. An electrode according to claim 1, wherein the pnictogene element is As.

7. An electrochemical cell comprising a negative electrode, an electrolyte and a positive electrode, the negative electrode including a material containing an intermetallic lithium/transition metal pnictide phase which is depicted by formula (I):

$$Li_xM_yPn_4 \quad (I),$$

wherein:
M represents a metal of one of the columns IVa and Va of the periodic chart of the elements;
Pn represents a pnictogene element, that is P or As;
x represents a number between 2.0 and 11.0; and
y represents a number between 0.2 and 2.2.

8. An electrochemical cell according to claim 7, wherein, in formula (I), M represents a metal of the group consisting of Ti, V, Nb and Ta.

9. A rechargeable lithium-ion battery which comprises a plurality of cells, electrically connected, each cell comprising a negative electrode, an electrolyte and a positive electrode, the negative electrode corresponding to a material containing an intermetallic lithium/transition metal pnictide phase depicted by formula (I):

$$Li_xMyPn_4 \quad (I),$$

wherein:
  M represents a metal of one of the columns IVa and Va of the periodic chart of the elements;
  Pn represents a pnictogene element, that is P or As;
  x represents a number between 2.0 and 11.0; and
  y represents a number between 0.2 and 2.2.

10. A rechargeable lithium battery according to claim 9, wherein, in formula (I), M represents a metal of the group consisting of Ti, V, Nb and Ta.

* * * * *